US005789869A

United States Patent [19]
Lo et al.

[11] Patent Number: 5,789,869
[45] Date of Patent: Aug. 4, 1998

[54] LIGHT SENSITIVE DIMMER SWITCH CIRCUIT

[75] Inventors: David Lo, Taipei; Tan Yuen Hung, Taichung, both of Taiwan

[73] Assignee: Holmes Products Corporation, Milford, Mass.

[21] Appl. No.: 714,896

[22] Filed: Sep. 17, 1996

Related U.S. Application Data

[60] Provisional application No. 60/011,776 Feb. 13, 1996.

[51] Int. Cl.[6] .................................................. H05B 37/02
[52] U.S. Cl. .................. 315/159; 315/155; 315/194; 315/DIG. 4; 250/214 AL; 250/221
[58] Field of Search ........................ 315/149, 155, 315/158, 159, 194, 199, DIG. 4; 250/214 R, 214 AL, 221; 340/567, 586; 362/276, 287, 250

[56] References Cited

U.S. PATENT DOCUMENTS

| | | | |
|---|---|---|---|
| 3,654,514 | 4/1972 | Kappenhagen | 315/156 |
| 3,742,295 | 6/1973 | Irie | 315/194 |
| 3,935,505 | 1/1976 | Spiteri | 315/194 |
| 4,008,416 | 2/1977 | Nakasone | 315/194 |
| 4,032,817 | 6/1977 | Richmond | 315/149 |
| 4,135,116 | 1/1979 | Smith | 315/158 |
| 4,658,129 | 4/1987 | Fan | 315/158 X |
| 5,015,994 | 5/1991 | Hoberman et al. | 340/567 |
| 5,489,891 | 2/1996 | Diong et al. | 315/155 X |
| 5,620,247 | 4/1997 | Swanson | 362/250 |

*Primary Examiner*—Robert J. Pascal
*Assistant Examiner*—Haissa Philogene
*Attorney, Agent, or Firm*—Hoffmann & Baron, LLP

[57] ABSTRACT

A light sensitive dimmer switch circuit for controlling the illumination level of a light as a function of the ambient illumination level surrounding the dimmer switch circuit by selectively controlling an AC power signal provided to the light includes a photocell and a phase control circuit. The photocell is responsive to the ambient illumination level and has a conduction state associated therewith. The conduction state changes, in response to the ambient illumination level, such that the photocell effectively exhibits either a substantially open circuit or a substantially short circuit. The phase control circuit selectively varies a conduction phase angle associated with the AC power signal which correspondingly causes a variation in the illumination level of the light. The phase control circuit, in response to the photocell, selectively varies such conduction phase angle and thus the illumination level associated with the light when the photocell exhibits an open circuit and, conversely, prohibits the AC power signal from being provided to the light when the photocell exhibits a short circuit. Preferably, the phase control circuit permits the light to illuminate approximately at a full illumination level while the photocell exhibits a short circuit. Thus, the light sensitive dimmer switch circuit controls the light such that a user may operate the same in either an off region, a dimming region or a full illumination region.

20 Claims, 9 Drawing Sheets

LIGHT SENSITIVE DIMMER SWITCH CIRCUIT

BACKGROUND OF THE INVENTION

This application claims the benefit of U.S. Provisional Application No. 60/011,776 filed on Feb. 13, 1996.

1. Field of the Invention

The present invention relates to dimmer switches and, more particularly, relates to light sensitive dimmer switches which may be employed in various lighting applications.

2. Description of the Prior Art

It is well known that lighting plays an important role, particularly in residential settings, in providing safety and security for both persons and personal property within a particular residence. For instance, a homeowner or resident may leave his home during the daylight hours and not return until after dark. Unless the person leaves a light on before leaving his residence, a practice which wastes electricity (and, therefore, money), that person will return home to a dark and, consequently, potentially dangerous dwelling. Not only may the returning homeowner damage his personal property while attempting to locate and turn on a light switch but, in addition, the person may fall and injury himself in the process. Even more foreboding is the possibility that an intruder may be lurking in the darkness, waiting to attack the unsuspecting homeowner.

Another situation which poses a more direct hazard to a homeowner's personal property occurs when the homeowner goes away on vacation for several days. It is commonly known that burglars will case out a target residence for several days prior to actually burglarizing the home. It will quickly become apparent to the burglar that the homeowner is away when he sees no lights on in the residence over the course of consecutive nights.

Attempts to combat these potentially harmful situations have included the use of mechanical timers to control the turning on and off of light fixtures within the residence. However, mechanical timers suffer from many disadvantages. For instance, homeowners who are not particularly mechanically inclined find the actual setting of the timers to present insurmountable difficulty. The person fortunate enough to be able to set the timers properly is then left with the possibility that the timers, many of which are poorly constructed, will not perform their operation properly. Also, it can be understood that the sight of a rather large timer protruding from a power outlet may not be aesthetically pleasing to the homeowner.

However, even if the mechanical timers function properly, another disadvantage associated with their use is that they only have the potential to completely turn on or completely turn off the light fixtures which they are controlling. This is a disadvantage in that lighting conditions may warrant the need to have some level of light present during daylight hours. For instance, extremely stormy weather may possibly present nighttime-like or, at least, dusk-like lighting conditions during the middle of the day. Therefore, a homeowner with a mechanical timer set for six o'clock in the evening who is returning home in the middle of the day would be faced with the same potential hazards discussed above.

Nonetheless, despite the waste of electricity associated with leaving a light on or using the potentially unreliable mechanical timers, such solutions to the problem suffer from at least one fundamental drawback, that is, they require continuous human intervention. The homeowner must remember to turn on the light before leaving during the day and if he makes use of timers, the homeowner must remember to reset the timers when lighting conditions change with the seasons or when the homeowners own schedule changes.

OBJECTS AND SUMMARY OF THE INVENTION

It is an object of the present invention to provide a light sensitive dimmer switch circuit which provides the ability to control the illumination level of a light as a function of the ambient illumination level surrounding the dimmer switch circuit.

It is another object of the present invention to provide a light sensitive dimmer switch circuit which may be employed with a light and be capable of providing a dimming region whereby the light illuminates at selective percentages of the total power output of the light as a function of the ambient light level surrounding the light fixture and the setting associated with the dimmer switch circuit.

It is yet another object of the present invention to provide a light sensitive dimmer switch circuit for selectively varying a conduction phase angle of the power waveform associated with the AC input of the present invention.

It is a further object of the present invention to provide a light sensitive dimmer switch circuit which may be employed with a light and be capable of operating the light at a full illumination level regardless of the level of ambient illumination surrounding the dimmer switch circuit.

It is still a further object of the present invention to provide a light sensitive dimmer switch circuit which may be employed in a light fixture in order to overcome the disadvantages associated with the prior art.

It is yet another object of the present invention to provide a light sensitive dimmer switch circuit which may be employed in a light fixture capable of providing a night light function.

In accordance with one form of the present invention, a light sensitive dimmer switch circuit for controlling the illumination level of a light as a function of the ambient illumination level surrounding the dimmer switch circuit by selectively controlling an AC power signal provided to the light includes a resistive network, a firing capacitor, means for generating a trigger signal and means for switching the AC power signal. The resistive network includes a photocell whereby the photocell is responsive to the ambient illumination level surrounding the dimmer switch circuit. The resistive network also has an equivalent resistance associated therewith which varies as a function of the photocell's response to the ambient illumination level. Further, the firing capacitor, in response to the resistive network, charges to a firing voltage at a rate corresponding to the equivalent resistance of the resistive network. Still further, the trigger signal generating means, in response to the firing capacitor, generates a trigger signal when the firing capacitor is substantially charged to the firing voltage. The AC power signal switching means, in response to the trigger signal, correspondingly permits the AC power signal to be provided to the light for a selective portion of a cycle of the AC power signal.

The photocell of the light sensitive dimmer switch circuit preferably exhibits either a substantially open circuit or a substantially short circuit in response to the ambient illumination level surrounding the dimmer switch circuit. Specifically, it is to be appreciated that the photocell has a threshold level associated therewith and may exhibit a substantially open circuit when the ambient illumination level surrounding the dimmer switch circuit is either equal to or less than the threshold level and, further, exhibits a substantially short circuit when the ambient illumination level surrounding the dimmer switch circuit is greater than the threshold level. Alternatively, it is to be understood that a photocell having a threshold level may operate such that the photocell exhibits a substantially open circuit when the ambient illumination level surrounding the dimmer switch circuit is less than the threshold level and, further, exhibits a substantially short circuit when the ambient illumination level surrounding the dimmer switch circuit is either equal to or greater than the threshold level.

Further, the resistive network preferably includes a variable resistor which is operatively coupled to the photocell and permits selective manual control of the portion of the cycle of the AC power signal provided to the light. Furthermore, the trigger signal generating means preferably includes at least one thyristor device which may preferably be a diac. Likewise, the AC power signal switching means preferably includes at least one thyristor device which may preferably be a triac. It is also to be appreciated that the switching means, in response to the trigger signal, may preferably correspondingly permit the AC power signal to be provided to the light for a selective portion of each half cycle of the AC power signal.

In accordance with another form of the present invention, the light sensitive dimmer switch circuit may include a photocell and a phase control circuit. The photocell is responsive to the ambient illumination level and has a conduction state associated therewith. Particularly, the conduction state of the photocell changes in response to the ambient illumination level surrounding the dimmer switch circuit such that the photocell effectively exhibits a substantially open circuit or a substantially short circuit depending on the level of the ambient illumination level. Furthermore, the phase control circuit of the light sensitive dimmer switch circuit selectively varies a conduction phase angle associated with the AC power signal. The conduction phase angle correspondingly causes a variation in the illumination level of the light. Specifically, the phase control circuit is responsive to the photocell such that the phase control circuit selectively varies this conduction phase angle and thus the illumination level associated with the light when the photocell exhibits an open circuit. Conversely, the phase control circuit prohibits the AC power signal from being provided to the light when the photocell exhibits a short circuit.

Furthermore, the phase control circuit preferably permits the light to illuminate at approximately a full illumination level while the photocell exhibits a short circuit. In other words, if the phase control circuit is adjusted to permit the light to illuminate at a full illumination level, the light will illuminate at such a full illumination level regardless of the ambient illumination level surrounding the dimmer switch circuit.

The phase control circuit preferably includes a resistor network, which is operatively coupled to the photocell and includes a variable resistor whereby the variable resistor has a variable resistance associated therewith. Further, the phase control circuit preferably includes a firing capacitor operatively coupled to the resistor network and the photocell which charges to a firing voltage as a function of the variable resistance of the variable resistor and the conduction state of the photocell. Still further the phase control circuit preferably includes a diac operatively coupled to the firing capacitor and which is responsive to the firing voltage such that the diac generates a trigger signal when the firing capacitor substantially reaches the firing voltage. Lastly, the phase control circuit preferably includes a triac operatively coupled to the diac and to the light whereby the triac is provided with the AC power signal and, in response to the trigger signal from the diac, permits a portion of the AC power signal to pass therethrough in order to illuminate a light at a corresponding illumination level.

In accordance with yet another form of the present invention, a light fixture assembly includes a light, a light sensitive dimmer switch circuit and a light fixture. Specifically, the light sensitive dimmer switch circuit is operatively coupled to the light and is responsive to the ambient illumination level surrounding the dimmer switch circuit and has a threshold level associated therewith. As previously mentioned, the dimmer switch circuit controls the illumination level of the light by selectively varying the portion of a cycle of an AC power signal provided to the light. The light fixture houses the light and the light sensitive dimmer switch circuit and includes a control knob. The control knob is operatively coupled to, and manually controls the dimmer switch circuit. The control knob has an off position whereby, when in such position, the dimmer switch circuit operates in an off region and thereby does not provide the AC power signal to the light. Also, the control knob has an on position whereby, when in such position, the dimmer switch circuit operates in either a full illumination region or a dimming region. When the dimmer switch circuit operates in the full illumination region, the light illuminates approximately at a full illumination level. When the dimmer switch circuit operates in the dimming region, the light illuminates approximately between the full illumination level and a minimum illumination level provided that the ambient illumination level is not above the threshold level of the dimmer switch circuit. In a preferred embodiment, the dimmer switch circuit permits the light to illuminate approximately at a full illumination level while operating in the dimming region regardless of the ambient illumination level surrounding the dimmer switch circuit.

In accordance with a method of the present invention, the illumination level of a light is controlled as a function of the ambient illumination level surrounding the light. The method includes providing a light sensitive dimmer switch circuit which includes a photocell exhibiting either an open circuit or a short circuit in response to the ambient illumination level. The dimmer switch circuit also includes a phase control circuit having a variable resistor operatively coupled to the photocell, a firing capacitor operatively coupled to the variable resistor, a diac operatively coupled to the firing capacitor and a triac operatively coupled to the diac and the light. The method includes setting the variable resistor to a particular value and thereby charging the firing capacitor to a firing voltage at a rate corresponding to the particular value of the variable resistor at a time when the photocell is exhibiting an open circuit. Next, the method includes firing the diac when the firing capacitor is approximately charged to the firing voltage and, then, generating a trigger signal when the diac fires. Lastly, the method includes triggering the triac into conduction in response to the trigger signal such that a portion of a cycle of an AC power signal provided to the dimmer switch circuit is provided to the light thereby causing the light to illuminate at a corresponding illumination level.

The method of controlling the illumination level of a light may further preferably include preventing the firing capacitor from charging to a firing voltage at a time when the photocell is exhibiting a short circuit. Still further, the method may preferably include permitting the firing capacitor to charge to the firing voltage at a time when the photocell is exhibiting a short circuit and the variable resistor is approximately set to a minimum value. It is to be appreciated that the minimum value of the variable resistor corresponds to the minimum resistance value associated with the variable resistor which, as will be explained in detail later, affects the charging rate of the firing capacitor.

As previously mentioned, prior art methods and devices for controlling lighting in various settings, particularly in residential settings, have included many debilitating drawbacks. Such drawbacks include user setup difficulties, device operation failures, limited adjustment controls and aesthetically unpleasing designs. However, the present invention uniquely overcomes these disadvantages, as well as other disadvantages that may be appreciated by one of ordinary skill in the art, by providing a light sensitive dimmer switch circuit which controls the illumination level of a light as a function of a convenient adjustment control and the ambient illumination level surrounding the light sensitive dimmer switch circuit. As will be discussed in greater detail in the detailed description to follow, the light sensitive dimmer switch circuit may be employed with any light fixture such that the light will turn on and off automatically as the ambient illumination level in the room changes from light to dark and back again. Specifically, the user may manually adjust the light sensitive dimmer switch circuit to an intermediate illumination level such that, as the ambient illumination level decreases to a threshold level associated with the light sensitive dimmer switch circuit, the light will gradually begin to illuminate. Preferably, once the ambient illumination level surrounding the light sensitive dimmer switch circuit substantially reaches the threshold level, the light will remain at an intermediate illumination level corresponding to the intermediate position at which the user sets the light sensitive dimmer switch circuit. Accordingly, an otherwise darkened room may advantageously be provided with a night light in the form of the present invention thus enabling the user, such as a homeowner, to enter the room without injuring himself or his personal property. Then, as the ambient illumination level surrounding the dimmer switch circuit increases through the threshold level, the light will eventually cease to illuminate and, thus, save the homeowner the cost associated with leaving a light on during the daytime hours. It is to be appreciated that a homeowner may operate the present invention such that the light illuminates at a full illumination level at any time of the day regardless of the ambient illumination level surrounding the light sensitive dimmer switch circuit.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1A:
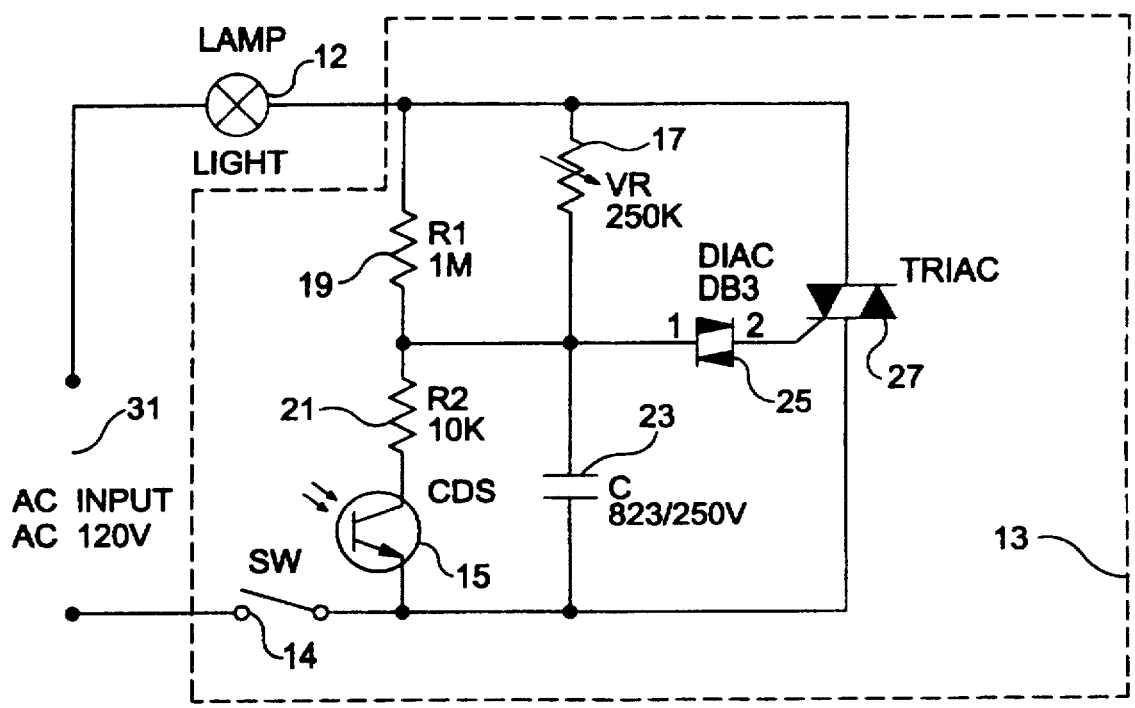
FIG. 1A is a schematic diagram of a light sensitive dimmer switch circuit formed in accordance with the present invention.

Referring initially to FIG. 1A, a schematic diagram of a light sensitive dimmer switch circuit 13 for controlling the illumination level of a light 12 is illustrated. Particularly, the light sensitive dimmer switch circuit 13 and the light 12 each have first and second terminals. The first terminal of the switch 13 is electrically connected to the second terminal of the light 12, while the first terminal of the light 12 and the second terminal of the switch 13 are electrically connected across AC input 31. It should be appreciated that AC input 31, in a preferred embodiment, supplies 120 VAC to the light sensitive dimmer switch circuit 13. AC input 31 may preferably be the corresponding power and return wires of a standard AC line cord.

The light sensitive dimmer switch circuit 13, itself, is composed of a single pole, single throw (SPST) switch 14 having first and second terminals which may alternately be in an opened or closed position; a light sensitive photocell 15 having a first terminal, a second terminal and a light sensitive portion; a variable resistor 17 having first, second and third (i.e., center tap or wiper) terminals; a first resistor 19 having first and second terminals; a second resistor 21 having first and second terminals; a capacitor 23 having first and second terminals, a diac 25 having first and second terminals and a triac 27 having first, second and third (i.e., gate) terminals. It is to be appreciated that, in a preferred embodiment, the SPST switch 14 may be formed as an integral part of variable resistor 17.

As will be discussed below in particular relation to the present invention, a photocell is a device with electrical characteristics that are light sensitive. Accordingly, it is to be appreciated that a photocell may serve as a switching device much the same as an ordinary transistor may serve such a purpose. However, because the photocell is light sensitive, the photocell has a threshold light intensity level (i.e., threshold level) associated therewith which determines the conducting condition of the device. In other words, if the light intensity surrounding the photocell (i.e., ambient illumination) is at or higher than the particular threshold level, then the photocell will effectively present a short circuit (i.e., a substantially low resistance) and, therefore, conduct current from its first terminal through its second terminal. However, if such light intensity is below the threshold level, then the photocell will effectively present an open circuit (i.e., a substantially high resistance) and, thus, not conduct current. It is to be appreciated that a photocell may be just as effectively employed that exhibits an open circuit when the ambient illumination level is at or less than the threshold level and exhibits a short circuit when the ambient illumination level is above the threshold level. Accordingly, it is also to be appreciated that the function of the photocell 15 of the present invention may be performed by a phototransistor, as illustrated in FIG. 1, whereby the first terminal is a collector terminal, the second terminal is an emitter terminal and the light sensitive portion is a base terminal. The phototransistor would thereby operate as a switch. However, the function of the photocell may also be performed by a photoresistor having a resistance which varies as a function of the surrounding ambient illumination level. It is to be understood that one of ordinary skill in the art would be able to choose the proper resistance range of the photoresistor given the other components of the dimmer switch circuit. Still further, the advantageous features of the present invention described herein may be accomplished via photodiodes which alternatively conduct and insulate depending upon the surrounding ambient light intensity.

The interconnection of the light sensitive dimmer switch circuit 13 will now be described. Specifically, the first terminal of the first resistor 19, the first and third terminals of the variable resistor 17 and the first terminal of the triac 27 are electrically connected to the second terminal of light 12. In other words, said terminals form the first terminal of the light sensitive dimmer switch circuit 13 of the present invention. Further, the second terminal of the first resistor 19, the second terminal of the variable resistor 17, the first terminal of the diac 25, the first terminal of the second resistor 21 and the first terminal of the capacitor 23 are all electrically connected to one another. Also, the second terminal of the second resistor 21 is electrically connected to the first terminal of the photocell 15. Still further, the second terminal of the SPST switch 14, the second terminal of the photocell 15, the second terminal of the capacitor 23 and the second terminal of the triac 27 are all electrically connected to one another. The second terminal of the diac 25 is electrically connected to the third terminal of the triac 27. Lastly, the first terminal of the SPST switch 14, which actually forms the second terminal of the light sensitive dimmer switch circuit 13 of the present invention, is electrically connected to the AC input 31.

Given the above-described electrical connection of its components, the operation of the light sensitive dimmer switch circuit 13, in conjunction with light 12 and AC input 31, will now be described. Basically, the light sensitive dimmer switch circuit 13 functions as a novel phase control circuit whereby a conduction phase angle associated with a power waveform of the AC power signal, provided via AC input 31, is selectively varied via the light sensitive dimmer switch circuit 13 of the present invention. Particularly, as will be explained in detail below, the selective varying of the conduction phase angle is accomplished through the setting of the variable potentiometer 17 and the conducting condition of the photocell 15.

Figure 1B:
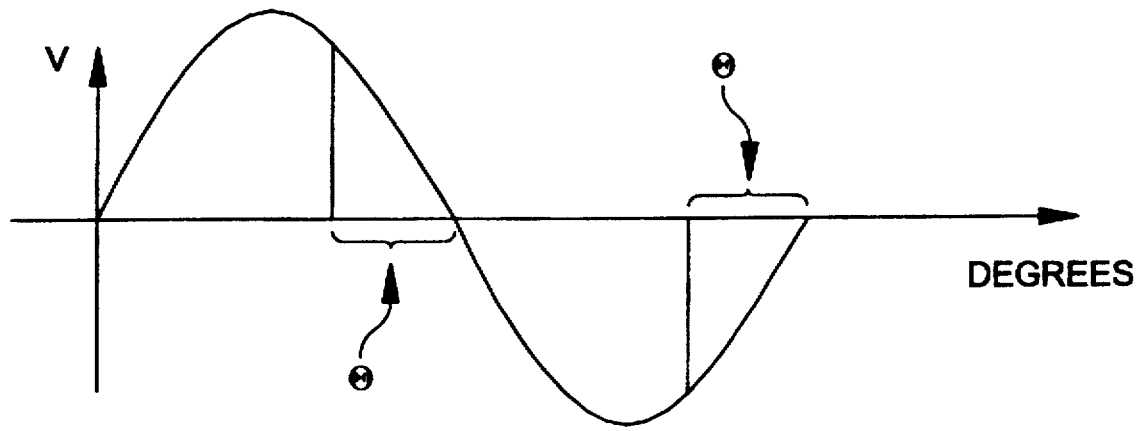
FIG. 1B is an exemplary graph illustrating the conduction phase angle associated with the AC power signal which is selectively varied by a light sensitive dimmer switch circuit formed in accordance with the present invention.

Referring to FIG. 1B, a waveform illustrating one cycle of a 60 Hz AC power signal provided by the AC input 31 to the light sensitive dimmer switch circuit 13 is shown. The graph depicts AC line voltage as a function of angular degrees. In particular, a conduction phase angle, θ, is illustrated which corresponds to the portion of the waveform which is provided to light 12 for each cycle of the waveform. Particularly, FIG. 1B illustrates the portion of the waveform provided to light 12 for each half cycle of the waveform. As will be explained in detail below, the portion of the power provided to light 12 is directly related to the conduction state of the triac 27. In other words, the amount of time that the triac 27 is conducting determines the percentage of power provided to the light 12. It should be understood that since circuit current is determined by the load and by the nature of the power source supplying the circuit, for the sake of simplificity, it is assumed for purposes of this description that the voltage and current waveforms are identical such as is the case with resistive loads. Thus, a conduction phase angle of approximately 150 degrees may, for example, translate into the light 12 operating at approximately 97% of its maximum power rating. On the other hand, a lower conduction phase angle would mean that a lesser percentage of the input power is provided to the load, while a higher conduction phase angle would mean a higher percentage is provided to the load. It is to be appreciated that the above example is merely illustrative of the relationship of the power output percentage as a function of conduction phase angle magnitude and, therefore, a similar conduction phase angle may yield a different power output percentage depending on the nature of the load and/or the particular values of the dimmer circuit components.

Accordingly, the specific manner in which the light sensitive dimmer switch circuit 13 controls the conduction phase angle associated with the power provided to light 12 will now be described. The conduction phase angle of the AC power input and, thus, the AC power provided to light 12, is controlled by the light sensitive dimmer switch circuit 13 such that dimmer switch circuit 13 provides essentially three regions of operation: an off region; a dimming region and a full illumination region.

The dimmer switch circuit 13 is in the off region when SPST switch 14 is in the opened position. In such a situation, the dimmer switch circuit 13 does not provide a return path for the AC power provided across AC input 31 and, therefore, no current flows through the circuit formed by dimmer switch circuit 13. However, when SPST switch 14 is in the closed position, the dimmer switch circuit 13 may operate in the dimming region or the full illumination region, as will be explained. It is to be appreciated that the conducting state of the photocell 15 determines whether the dimmer switch circuit 13 of the present invention is operating in the dimming region or the full illumination region.

As previously mentioned the dimmer switch circuit of the present invention forms a unique phase control circuit. Accordingly, the phase control circuit of the present invention functionally operates in the following manner. The variable resistor 17, the first resistor 19 and, depending on the condition of photocell 15 as will be explained, the second resistor 21 and the photocell 15 essentially form a resistive network through which control of the charging of capacitor 23 to a particular voltage level is provided. Characteristically associated with the diac 25 is a breakover or firing voltage (i.e., voltage at which the diac will begin to operate or conduct) which, when applied to the first terminal of the diac 25, causes the diac 25 to enter a negative resistance region. When the diac 25 is operating in this negative resistance region, the capacitor 23 discharges through the diac 25 preferably in the form of a bidirectional pulsing output signal (i.e., trigger signal) which is present on the second terminal of the diac 25. It is to be appreciated that other forms of trigger signals may be realized by the present invention depending upon the type of thyristor devices used. Nonetheless, this trigger signal is applied to the third (i.e., gate) terminal of the triac 27. The triac 27 is then triggered into a conduction mode whereby the AC power signal, previously prevented by the triac 27 from flowing therethrough, passes through the triac 27 from the second terminal to the first terminal for the remaining portion of the half cycle of the AC power (i.e., for the duration of the conduction phase angle θ).

A hysteresis effect may commonly occur in the phase control circuit due to the operation of the capacitor 23 and the diac 25. Specifically, over the course of one full cycle of the AC line voltage the capacitor 23 will be charging to the firing voltage of the diac 25. Once the firing voltage is reached and the diac 25 fires, the capacitor 23 will discharge to approximately half of the firing voltage thus leaving a residual charge on capacitor 23. Accordingly, an initial conduction phase angle $\theta_i$ is realized. In the next half cycle of the AC line voltage, the capacitor 23 again charges from its residual charge level to the diac firing voltage causing the diac 25 to trigger the triac 27 into a conduction state. Accordingly, a steady state conduction phase angle θ, as illustrated in FIG. 1B, is formed from the firing point to the end of the half cycle of the AC line voltage whereby the triac 27 will conduct in this conduction phase angle region for each subsequent half cycle. In an alternative approach, it is to be understood that the operating characteristics of the capacitor 23 and the diac 25 may be selected such that the voltage of the capacitor 23 is at or near zero at the beginning of each half cycle and, therefore, no hysteresis effect will occur.

It is to be appreciated that the speed with which the capacitor 23 is charged to the diac firing voltage and, thus, the magnitude of the conduction phase angle with respect to the AC power waveform, is determined by the RC (resistor-capacitor) time constant created between the resistive network and capacitor 23. Referring again to FIG. 1A, it can be seen that the resistive network will affect the current that will flow through capacitor 23 causing capacitor 23 to charge.

Assuming for the moment that the ambient illumination level surrounding the light sensitive dimmer switch circuit 13 is of a sufficiently low intensity (e.g., nighttime) as to cause the photocell 15 to effectively present an open circuit, it should be understood that the RC time constant is determined by the equivalent resistance formed by the parallel combination of the first resistor 19 and the variable resistor 17. This is due to the fact that when the photocell 15 effectively presents a substantially open circuit and therefore does not conduct, current will not flow through that branch of the circuit. Accordingly, current will flow through the first resistor 19 and the variable resistor 17 and, accordingly, such combination will provide the control of the RC time constant and, thus, the variation of the conduction phase angle. If first resistor 19 is preferably chosen to be of a sufficiently higher resistance value than the maximum resistance value of variable resistor 17, then current will substantially flow through variable resistor 17 thereby permitting variable resistor 17 to effectively control the RC time constant.

It is, in part, during such ambient lighting condition and, thus, such non-conducting condition of the photocell 15, that the dimmer switch circuit 13 is said to be operating in the dimming region. Essentially, the adjustment of the variable resistor 17 affects the equivalent resistance (i.e., the first resistor 19 in parallel with the variable resistor 17 in this mode) through which the capacitor 23 is charged. For example, when variable resistor 17 is adjusted to be at a higher resistance, less current flows therethrough causing the capacitor 23 to take a longer time to charge to the firing voltage of the diac 25. Accordingly, the longer it takes for the diac 25 to fire and thus trigger the triac 27, the smaller the conduction phase angle θ will be and, as a result, the triac 27 will conduct only over a smaller portion of the AC power waveform. Therefore, based on the conduction time of the triac 27, the light 12 will illuminate at a proportionately lower intensity. It is to be appreciated that as the variable resistor 17 is selectively adjusted to exhibit a lower resistance, the more current passes therethrough, thus charging the capacitor 23 more quickly. As a result, the diac 25 will fire sooner and trigger the triac 27 in order that the triac 27 will conduct over a longer portion of the AC power waveform, i.e., produce a larger conduction phase angle θ. The light 12 will, therefore, operate at a proportionately higher intensity.

On the other hand, when the ambient light level surrounding the light sensitive dimmer switch circuit 13 is of a sufficiently high intensity (e.g., daytime) as to cause the photocell 15 to begin conducting, it should be understood that the RC time constant associated with the dimmer switch circuit of the present invention is determined by the equivalent resistance formed by the network of the first resistor 19, the variable resistor 17, the second resistor 21 and the conducting photocell 15. In a preferred embodiment, the values of the components of the effective network may be chosen such that the capacitor 23 will not charge to the firing voltage of the diac 25 until the variable resistor 17 is adjusted to be substantially near its lowest resistance value. In this way, the triac 27 will not conduct and the light 12 will not illuminate until the variable resistor 17 is at such a value. When the variable resistor 17 is set to such value, the light 12 will illuminate at substantially its full power rating. In other words, the conducting photocell 15 effectively provides a short circuit across capacitor 23 not allowing it to charge until the variable resistor 17 is adjusted to be substantially near its lowest resistance value. When the variable resistor 17 is adjusted to this point, the dimmer switch circuit 13 is considered to be operating in the full illumination region. It should also be understood that, given the unique structure and operation of the dimmer switch circuit 13 described herein, one of ordinary skill in the art would appreciate that the values of the components of the dimmer switch circuit 13 of the present invention may be chosen to provide for no illumination of light 12 when the ambient illumination level surrounding the photocell 15 is at a sufficiently high level whereby the photocell exhibits a short circuit.

Furthermore, it should be understood that in a preferred embodiment of the dimmer switch circuit 13 operating in the dimming region, the dimmer switch circuit 13 may be adjusted to permit the light 12 to substantially illuminate at its full power rating, such as is the case when the dimmer switch circuit 13 is operating in the full illumination region. Thus, in a preferred embodiment, when the variable resistor 17 of the dimmer switch circuit 13 is adjusted to be substantially around its lowest resistance value, the light 12 will substantially illuminate at its full power rating (illumination level) regardless of the ambient illumination level surrounding the photocell 15 and, thus, the conduction state of the photocell 15.

Also, it is to be appreciated that while the photocell preferably operates as a switch, the device may exhibit varying resistance values as the ambient illumination level changes around the device. For instance, as the ambient illumination level decreases around photocell 15, thus approaching the threshold level of the photocell 15, a resistance associated with photocell 15 will proportionately increase. If the variable resistor is set to an intermediate value and the ambient illumination level is above the threshold level, the photocell 15 varies in resistance with decreasing ambient light thus permitting the resistance of the photocell 15 to effect the RC time constant until the threshold level is passed thus causing the photocell to exhibit an open circuit and the variable resistor 17 to effectively control the RC time constant. Therefore, with the variable resistor 17 fixed at an intermediate value, the resistance of the photocell 15 will increase with decreasing ambient light, causing more current to flow towards the capacitor 23 thereby causing capacitor 23 to charge faster. As a result, the illumination level of light 12 may increase as the ambient illumination around the photocell 15 approaches the threshold level. Once the threshold level is passed, the photocell is effectively an open circuit and the RC time constant will be fixed for each half cycle by the particular setting of the variable resistor 17. It is to be appreciated that the dimmer switch circuit 13 is also considered to be in the dimming region during the above-described condition where the ambient light level is decreasingly approaching the threshold light level and the varying resistance of the photocell 15 contributes to the control of the RC time constant and thus the illumination level of light 12.

Figure 2A:
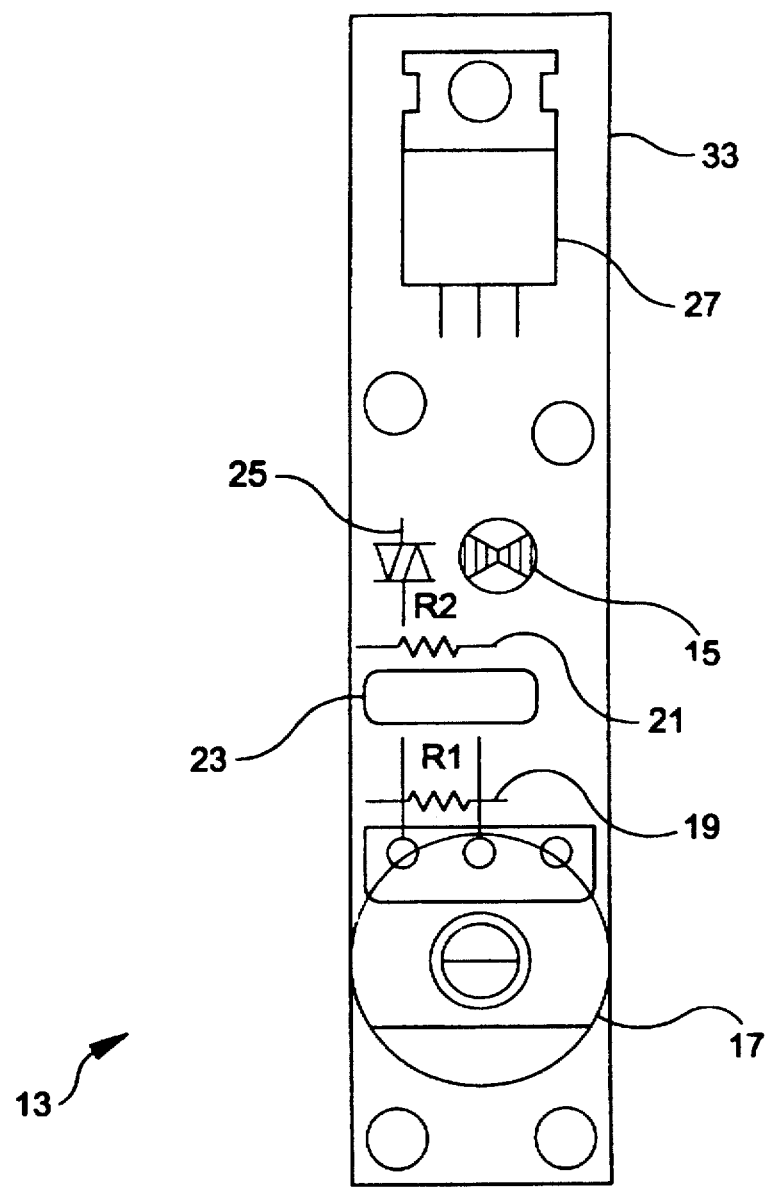
FIG. 2A through 2D are various views of a printed circuit board embodiment of a light sensitive dimmer switch circuit formed in accordance with the present invention.
Figure 2B:
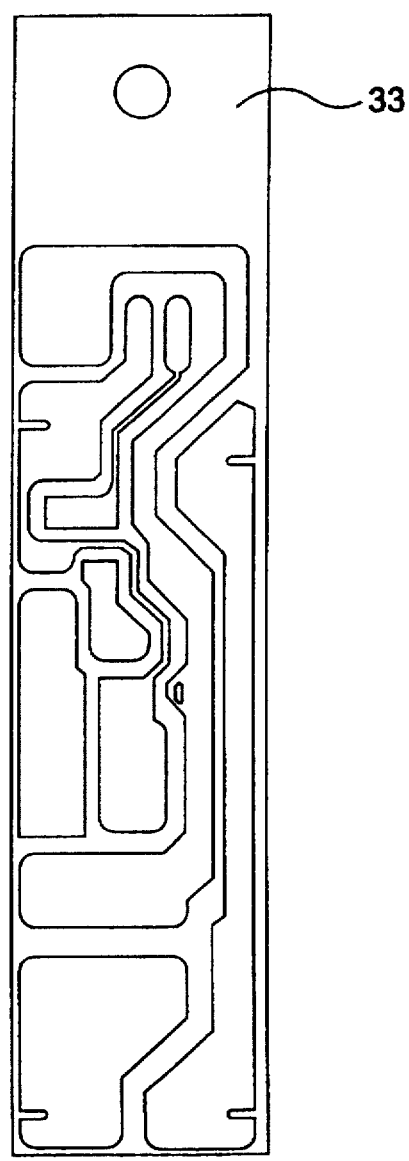
Figure 2C:
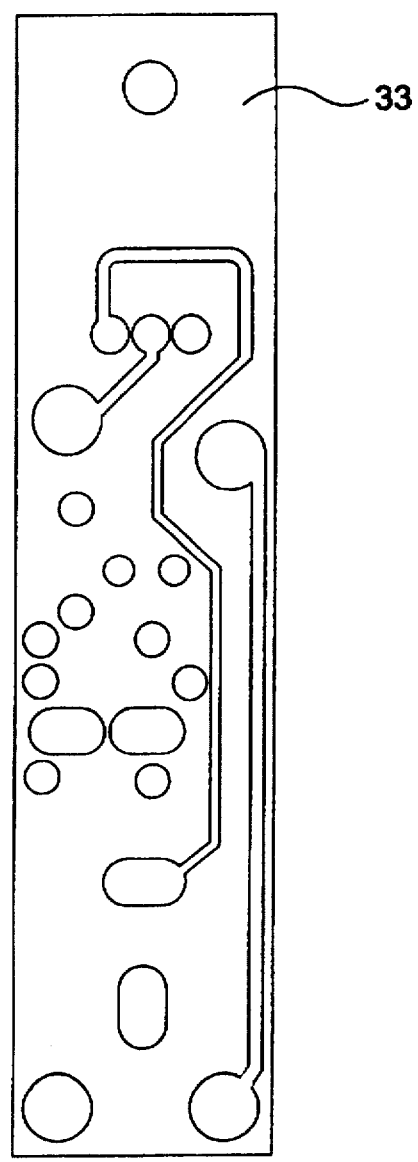
Figure 2D:
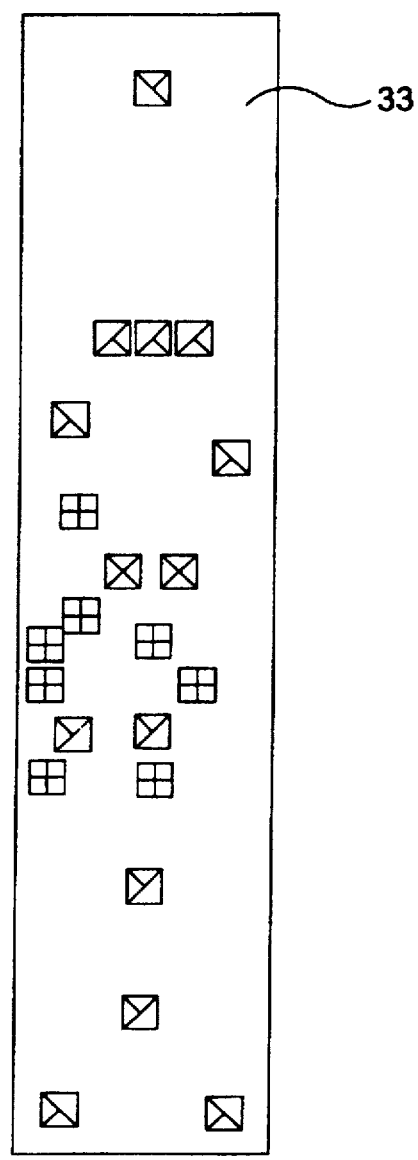

Referring now to FIG. 2A, a top plan view of the light sensitive dimmer switch circuit 13 assembled on a printed circuit board 33 is shown. The printed circuit board 33 may preferably be of the type manufactured by Long Chang Printed Circuit Co., LTD. having a part number E 94733 of the type LC-01 HB. Particularly, as can be seen in FIG. 2A, the components of the dimmer switch circuit 13 are arranged on the printed circuit board 33 and preferably electrically interconnected in a manner as described above. FIGS. 2B, 2C and 2D illustrate various views of the printed circuit board 33. Particularly, FIG. 2B illustrates a bottom layer view, FIG. 2C illustrates a bottom overlay view and FIG. 2D illustrates a drill drawing of the printed circuit board 33.

Figure 3:
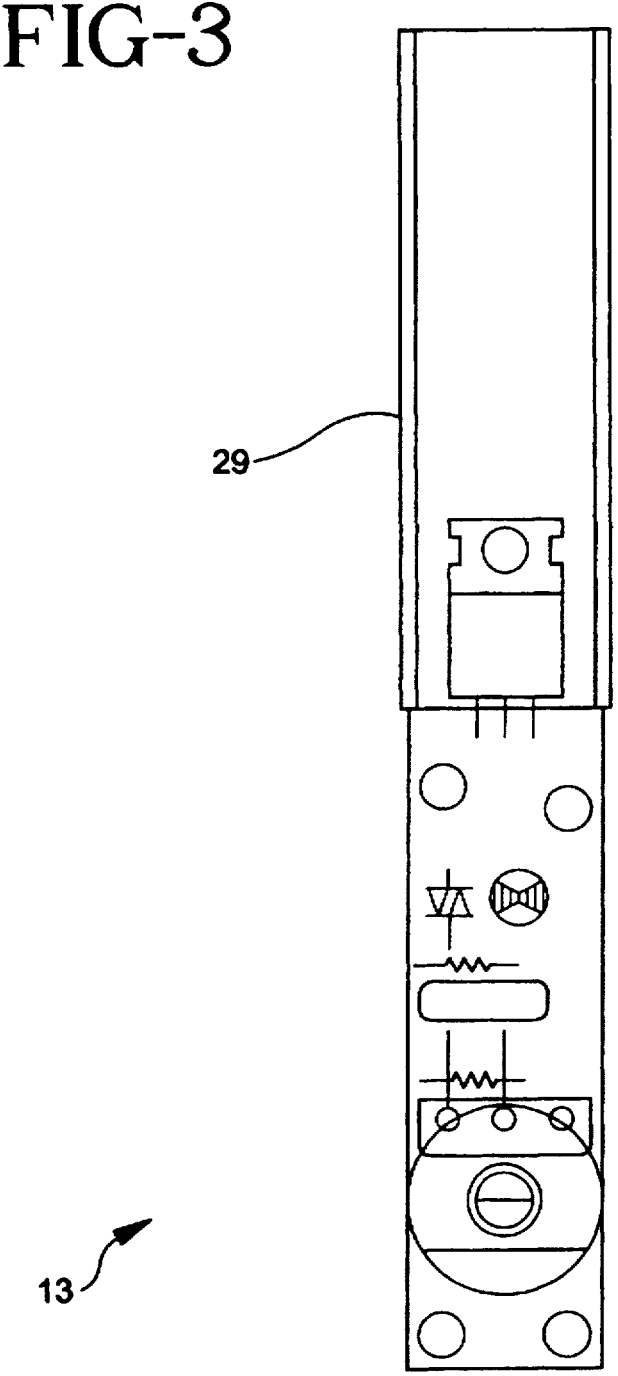
FIG. 3 illustrates the light sensitive dimmer switch circuit, as illustrated in the printed circuit board embodiment of FIG. 2A, including a heat sink operatively mounted with the triac.
Figure 4:
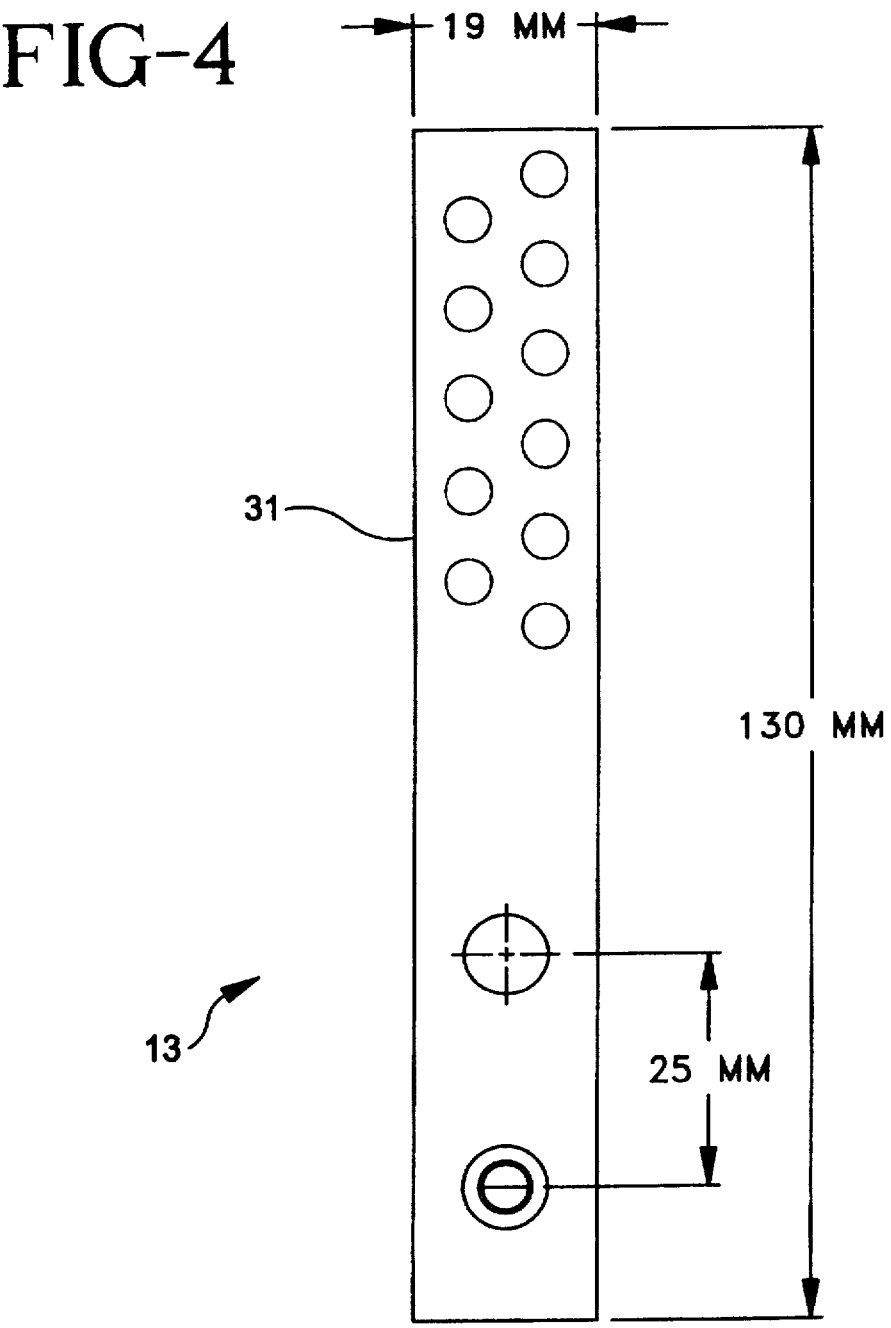
FIG. 4 illustrates a cover for the light sensitive dimmer switch circuit illustrated in FIG. 3.

Referring now to FIG. 3, a heat sink 29 may preferably be mounted in heat conducting proximity to triac 27 to sufficiently dissipate the heat generated when the triac 27 is in a conducting state. The heat sink 29 may preferably be of a type having a U-shaped 2 millimeter (mm) thick aluminum channel and having minimum dimensions of approximately 58 mm×17 mm×9 mm. Furthermore, as illustrated in FIG. 4, a cover 31 may preferably be mounted on the dimmer switch circuit 13. The cover (i.e., barrier) may be formed with fiber impregnated paper folded around the printed circuit board 33 and secured with tape approximately 0.7 mm in thickness. In a preferred embodiment, the cover 31 extends beyond the end of the heat sink 29 by approximately 9 mm.

Figure 5:
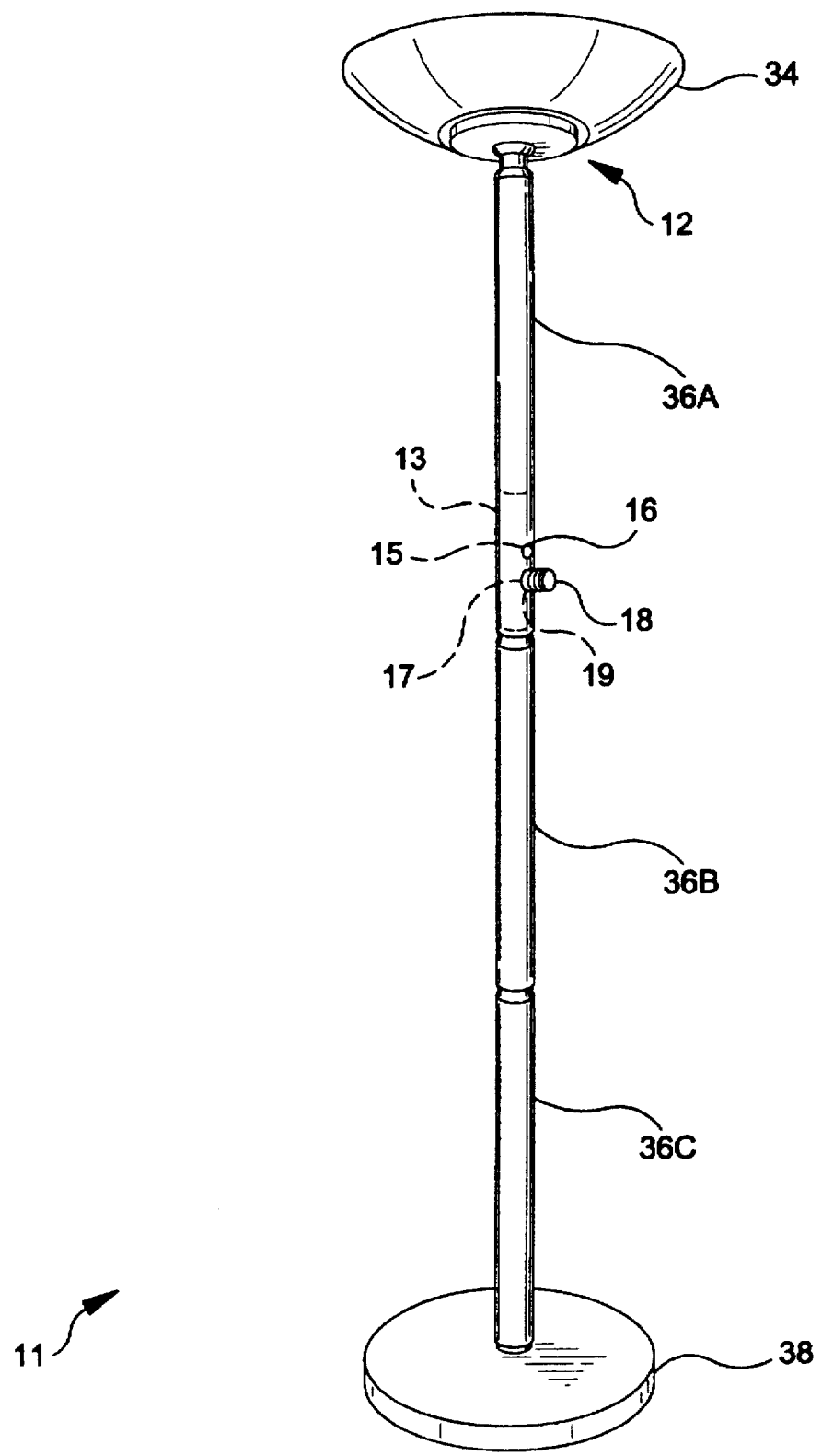
FIG. 5 is one form of a light fixture employing a light sensitive dimmer switch circuit formed in accordance with the present invention.

Referring now to FIG. 5, a lamp 11, which employs the light sensitive dimmer switch circuit 13 of the present invention to uniquely control the illumination level of light 12, is illustrated. In particular, lamp 11 is exemplified as a 72 inch torchiere floor lamp; however, it is to be appreciated that the novel light sensitive dimmer switch circuit 13 may be employed with any type of light fixture known in the art. As shown in FIG. 5, lamp 11 includes a sconce-type crown 34, in which the light 12 may be mounted, and a base 38. The light 12 is preferably a high intensity halogen lamp. The lamp 11 also includes a lamp pole having a top pole portion 36A, a middle pole portion 36B and a bottom pole portion 36C, each having a first end and a second end opposite the first end. The first end of top pole portion 36A is attached to the crown 34, while its second end is attached to the first end of middle pole portion 36B. The second end of middle pole portion 36B is attached to the first end of bottom pole portion 36C, while the second end of bottom pole portion 36C is attached to the base 38. It is to be understood that the lamp 11 may alternatively be formed with a single unitary lamp pole.

The light sensitive dimmer switch circuit 13 is preferably mounted in the top pole portion 36A of the lamp pole. Top pole portion 36A includes a first opening 16 which preferably includes a transparent plastic lens covering the opening 16. In order to be responsive to the ambient light level surrounding lamp 11, the dimmer switch circuit 13 is mounted inside top pole portion 36A such that the photocell 15 substantially aligns with opening 16. Likewise, a second opening 19 is formed in top pole portion 36A such that the variable resistor 17, with SPST switch 14 integrated therewith, aligns with said second opening 19.

A control knob 18 may be attached to variable resistor 17 in order to control the turning on and off of the dimmer switch circuit 13 (i.e., via SPST switch 14) and to selectively vary the resistance value of the variable resistor 17. The control knob 18 may preferably rotate in a clockwise or counter-clockwise direction. Initially, when the control knob 18 is in the full counter-clockwise position, the SPST switch 14 is in the open position thus causing the dimmer switch circuit 13 to be in the off region. When the control knob 18 is slightly rotated in the clockwise direction, SPST switch 14 moves (e.g., clicks) to the closed position whereby the dimmer switch circuit 13 may operate in either the full illumination or dimming regions. Once SPST switch 14 is closed, control knob 18 may rotate the wiper (i.e., third) terminal of the variable resistor 17 through its full rotational travel. The rotational travel of the variable resistor 17 may be greater than 360 degrees (e.g., multi-turn potentiometer) but is preferably less than or approximately 360 degrees. Also, the variable resistor 17 preferably increases in resistance as the knob 18 is turned in a counter-clockwise direction and decreases when rotated in a clockwise direction. It is to be understood that the wiper of the variable resistor 17 may alternatively be a sliding-type potentiometer in which case the control knob would be moved linearly in order to vary the resistance of the variable resistor 17. It is also to be appreciated that AC power from an external source such as a wall power outlet may be provided to the dimmer switch circuit 13, as AC input 31, via a line cord (not shown) extending from base 38.

The ability of the present invention to provide the unique functionality described herein permits a light fixture employing the light sensitive dimmer switch circuit 13, such as the light fixture illustrated in FIG. 5, to overcome the disadvantages associated with existing household light fixtures. For instance, lamp 11 formed in accordance with the present invention may provide a homeowner or resident with residential lighting control that is unavailable in the prior art. Particularly, lamp 11 may be operated at full intensity by turning control knob 18 to approximately a full clockwise position which will permit dimmer switch circuit 13 to operate in the full illumination region regardless of the ambient light level surrounding the lamp 11, as discussed above. However, the homeowner may also advantageously operate lamp 11 of the present invention in the dimming region to provide a "night light" function. Particularly, the homeowner may turn the control knob 18 clockwise to some intermediate position (i.e., below the full clockwise position) before leaving his home in the morning. Since it is daylight and, therefore, the ambient illumination level surrounding the lamp 11 will be above the threshold level of the photocell 15, light 12 will not illuminate. However, as nighttime approaches and the ambient illumination level surrounding the lamp 11 decreases toward and then below the threshold level, photocell 15 will conduct and light 12 will gradually increase in intensity to an illumination level that corresponds with the intermediate level at which the variable resistor 17 was originally set to by the homeowner. The light 12 will remain illuminated at that particular intermediate intensity level while the ambient illumination remains substantially below the threshold level of the photocell 15. Accordingly, when the homeowner returns home at night, the lamp 11 will be illuminated and serve as a night light allowing the homeowner to safely enter his residence without the fear of tripping over unseen objects in the dark or being confronted by a burglar lurking therein. Further, the control knob 18 may be left in the same position such that, come daylight when the ambient illumination increases past the threshold level, the photocell will start conducting thereby causing the light 12 to stop illuminating. Then, the process will advantageously repeat itself each night without the need for the homeowner to adjust or reset the control knob 18.

It is to be appreciated that the homeowner may adjust the variable resistor 17 via the control knob 18, once in the dimming region, to various intensity levels ranging from no illumination from light 12 to full illumination from light 12. Once this is done, the lamp 11 employing the dimmer switch circuit 13 will automatically provide the unique night light function to the homeowner during each transition from daytime to nighttime. Furthermore, unlike conventional mechanical timers, since the dimmer switch circuit 13 operates as a function of ambient illumination surrounding the lamp 11 rather than purely on the basis of time, the lamp 11 will illuminate during the middle of the day if the ambient illumination level falls below the threshold level such as may be the case during an afternoon thunderstorm or during a spell of extremely cloudy weather.

It should be understood that while the unique functionality of the present invention has been explained in the context of residential lighting control as operated by a homeowner, the present invention may find application in any setting which requires lighting control. By way of example, businesses may utilize the light sensitive dimmer switch circuit 13 to control lighting fixtures inside and outside of their facilities. For that matter, a homeowner or resident may also operate light fixtures formed in accordance with the present invention outside their residence as well.

An example of a light sensitive dimmer switch circuit 13 formed in accordance with the present invention, and as exemplified in FIG. 1A, may preferably have components having the following exemplary part numbers and/or values. The photocell 15 may preferably be of the type manufactured by Zeino Taiwan, LTD. and have a part no. ZNY-52050. The variable resistor 17, with SPST switch 14 integrated therein, may preferably have a value of approximately 250 kiloohms and be of the type manufactured by Zing Ear Enterprises, Co., LTD. and have a part no. ZE-601 (E89885) which is approximately rated at 125 VAC, 3 Amps. The triac 27 may preferably be of the type manufactured by SGS-Thomson, Co., LTD. and have a part no. BTA-12B which is approximately rated at 400 Volts, 1.2 Amps. The diac 25 may preferably also be of the type manufactured by SGS-Thomson, Co., LTD. and have a part no. DB3 which is approximately rated to have a breakover voltage of 32 Volts and a repetitive peak on-state current of 2 Amps. The first resistor 19 may preferably have a value of approximately 1 Megaohm, while the second resistor 21 may preferably have a value of approximately 10 kiloohms. Capacitor 23 may preferably have a value of approximately 823 picofarads and be rated at 250 volts. AC input 31 may preferably be any type of properly rated line cord such as Listed Line Cord part no. SPT-1 approximately rated at 300 VAC. Light 12, as utilized in lamp 11, may preferably be a 300 Watt halogen bulb.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A light sensitive dimmer switch circuit for controlling the illumination level of a light as a function of the ambient illumination level, the dimmer switch circuit comprising:

a resistive network, the resistive network including a photocell and a manually controlled variable resistor operatively coupled thereto to control the illumination level of the light, the photocell being responsive to the ambient illumination level, the resistive network having an equivalent resistance associated therewith, the equivalent resistance varying as a function of the photocell responding to the ambient illumination level;

a firing capacitor, the firing capacitor being responsive to the resistive network; and charging to a firing voltage at a rate corresponding to the equivalent resistance of the resistive network;

means for generating a trigger signal, the trigger signal generating means being responsive to the firing capacitor and generating a trigger signal when the firing capacitor is substantially charged to the firing voltage; and means for switching an AC power signal, the switching means being responsive to the trigger signal and correspondingly permitting the AC power signal to be provided to the light for a selective portion of a cycle of the AC power signal, wherein setting the variable resistor to a minimum value allows the firing capacitor to charge to a firing voltage thereby illuminating the light regardless of the ambient illumination level operating on the photocell.

2. A light sensitive dimmer switch circuit as defined in claim 1, wherein the photocell exhibits one of a substantially open circuit and a substantially short circuit in response thereto.

3. A light sensitive dimmer switch circuit as defined in claim 2, wherein the photocell has a threshold level associated therewith and exhibits a substantially open circuit when the ambient illumination level is one of equal to and less than the threshold level and exhibits a substantially short circuit when the ambient illumination level is greater than the threshold level.

4. A light sensitive dimmer switch circuit as defined in claim 2, wherein the photocell has a threshold level associated therewith and exhibits a substantially open circuit when the ambient illumination level is less than the threshold level and exhibits a substantially short circuit when the ambient illumination level is one of equal to and greater than the threshold level.

5. A light sensitive dimmer switch circuit as defined in claim 1, wherein the variable resistor controls the portion of the cycle of the AC power signal provided to the light.

6. A light sensitive dimmer switch circuit as defined in claim 1, wherein the trigger signal generating means includes at least one thyristor device.

7. A light sensitive dimmer switch circuit as defined in claim 6, wherein the at least one thyristor device is a diac.

8. A light sensitive dimmer switch circuit as defined in claim 1, wherein the switching means includes at least one thyristor device.

9. A light sensitive dimmer switch circuit as defined in claim 8, wherein the at least one thyristor device is a triac.

10. A light sensitive dimmer switch circuit as defined in claim 1, wherein the switching means, in response to the trigger signal, correspondingly permits the AC power signal to be provided to the light for a selective portion of each half cycle of the AC power signal.

11. A light sensitive dimmer switch circuit for controlling the illumination level of a light as a function of the ambient illumination level, the dimmer switch circuit comprising:

a photocell, the photocell being responsive to the ambient illumination level and having a conduction state associated therewith, the conduction state changing in response to the ambient illumination level such that the photocell effectively exhibits one of a substantially open circuit and a substantially short circuit in response to the ambient illumination level; and a phase control circuit, the phase control circuit selectively varying a conduction phase angle associated with an AC power signal provided to the light which correspondingly causes a variation in the illumination level of the light, the phase control circuit being responsive to the conduction state of the photocell wherein the phase control circuit includes means for permitting the light to illuminate approximately at a full illumination level regardless of the conduction state of the photocell.

12. A light sensitive dimmer switch circuit as defined in claim 11, wherein the permitting means includes a manually adjustable variable resistor in the phase control circuit.

13. A light sensitive dimmer switch circuit as defined in claim 12, wherein the phase control circuit includes:

a resistor network, the resistor network being operatively coupled to the photocell and including a variable resistor, the variable resistor having a selectively variable resistance associated therewith;

a firing capacitor, the firing capacitor being operatively coupled to the resistor network and the photocell, the firing capacitor being charged to a firing voltage as a function of the variable resistance of the variable resistor and the conduction state of the photocell;

a diac, the diac being operatively coupled to the firing capacitor and being responsive to the firing voltage, the diac generating a trigger signal when the capacitor substantially reaches the firing voltage; and a triac, the triac being operatively coupled to the diac and to the light, the triac being provided with the AC power signal and, in response to the trigger signal, permitting a portion of the AC power signal to pass therethrough in order to illuminate the light at a corresponding illumination level.

14. A light fixture assembly, the light fixture assembly comprising:

a light;

a light sensitive dimmer switch circuit, the dimmer switch circuit being operatively coupled to the light, the dimmer switch circuit being responsive to ambient illumination level and having a threshold level associated therewith, the dimmer switch circuit controlling the illumination level of the light by selectively varying the portion of a cycle of an AC power signal provided to the light; and a light fixture, the light fixture housing the light and the light sensitive dimmer switch circuit and including a control knob;

the control knob being operatively coupled to the dimmer switch circuit for manually controlling the dimmer switch circuit, the control knob having an off position whereby the dimmer switch circuit operates in an off region and thereby does not provide the AC power signal to the light, the control knob also having an on position whereby the dimmer switch circuit operates in one of a full illumination region and a dimming region such that when the dimmer switch circuit operates in the full illumination region the light illuminates approximately at a full illumination level and when the dimmer switch circuit operates in the dimming region the light illuminates approximately between the full illumination level and a minimum illumination level provided that the ambient illumination level is not substantially above the threshold level of the dimmer switch circuit, wherein the dimmer switch circuit permits the light to illuminate approximately at a full illumination level while the control knob is in the on position regardless of the ambient illumination level surrounding the dimmer switch circuit.

15. A light fixture as defined in claim 14, wherein the dimmer switch circuit comprises:

a resistive network, the resistive network including a photocell, the photocell being responsive to the ambient illumination level, the resistive network having an equivalent resistance associated therewith, the equivalent resistance varying as a function of the photocell responding to the ambient illumination level;

a firing capacitor, the firing capacitor being responsive to the resistive network and charging to a firing voltage at a rate corresponding to the equivalent resistance of the resistive network;

means for generating a trigger signal, the trigger signal generating means being responsive to the firing capacitor and generating a trigger signal when the firing capacitor is substantially charged to the firing voltage; and means for switching an AC power signal, the switching means being responsive to the trigger signal and correspondingly permitting the AC power signal to be provided to the light for a selective portion of a cycle of the AC power signal.

16. A light fixture as defined in claim 14, wherein the light sensitive dimmer switch circuit comprises:

a photocell, the photocell being responsive to the ambient illumination level and having a conduction state associated therewith, the conduction state changing in response to the ambient illumination level such that the photocell effectively exhibits one of a substantially open circuit and a substantially short circuit in response to the ambient illumination level; and a phase control circuit, the phase control circuit selectively varying a conduction phase angle associated with an AC power signal provided to the light which correspondingly causes a variation in the illumination level of the light, the phase control circuit being responsive to the photocell such that the phase control circuit selectively varies the conduction phase angle thus varying the illumination level associated with the light when the photocell exhibits an open circuit and prohibits the AC power signal from being provided to the light when the photocell exhibits a short circuit.

17. A light fixture as defined in claim 14, wherein the light fixture is a torchiere floor lamp.

18. A light fixture as defined in claim 14, wherein the light is a halogen bulb.

19. A method of controlling the illumination level of a light as a function of the ambient illumination level, the method comprising the steps of:

a) providing a light sensitive dimmer switch circuit including a photocell exhibiting one of an open circuit and a short circuit in response to the ambient illumination level, the dimmer switch circuit also including a phase control circuit having a variable resistor operatively coupled to the photocell, a firing capacitor operatively coupled to the variable resistor, a diac operatively coupled to the firing capacitor and a triac operatively coupled to the diac and the light;

b) setting the variable resistor to a particular value;

c) charging the firing capacitor to a firing voltage at a rate corresponding to the particular value of the variable resistor at a time when the photocell is exhibiting an open circuit;

d) firing the diac when the firing capacitor is approximately charged to the firing voltage;

e) generating a trigger signal when the diac fires;

f) triggering the triac into conduction in response to the trigger signal such that a portion of a cycle of an AC power signal provided to the dimmer switch circuit is provided to the light thereby causing the light to illuminate at a corresponding illumination level: and g). permitting the firing capacitor to charge to the firing voltage at a time when the photocell is exhibiting a short circuit and the variable resistor is approximately set to a minimum value.

20. A method of controlling the illumination level of a light as defined in claim 19, further including the step of:

preventing the firing capacitor from charging to the firing voltage at a time when the photocell is exhibiting a short circuit.

* * * * *